United States Patent [19]
McGuire

[11] Patent Number: 4,940,211
[45] Date of Patent: Jul. 10, 1990

[54] PROCESS FOR BUILDING WIRE

[76] Inventor: Samuel R. McGuire, 11 Charlbury St., Greenville, S.C. 29607

[21] Appl. No.: 770,351

[22] Filed: Aug. 26, 1985

Related U.S. Application Data

[63] Continuation of Ser. No. 550,924, Nov. 10, 1983, abandoned.

[51] Int. Cl.⁵ .............................................. B65H 59/00
[52] U.S. Cl. .............................................. 254/134.3 R
[58] Field of Search .............. 254/134.3 R, 134.3 FT, 254/134.3 CL, 134.3 PA; 124/40 R, 41, 43, 44, 48, 110 FC; 269/903

[56] References Cited

U.S. PATENT DOCUMENTS

| | | | |
|---|---|---|---|
| 2,390,192 | 12/1945 | St. Clair | 174/43 |
| 2,822,146 | 2/1958 | Ridgers et al. | 254/134.3 CL |
| 3,054,710 | 9/1962 | Nixon | 174/110 FC |
| 3,153,117 | 10/1964 | Hill | 174/40 R |
| 3,474,183 | 10/1969 | Kelly et al. | 174/41 |
| 3,683,100 | 8/1972 | Deal et al. | 174/48 |
| 3,863,897 | 2/1975 | Yeager | 254/134.3 R |
| 4,224,627 | 1/1984 | Tarbox | 269/903 |

Primary Examiner—Robert C. Watson
Attorney, Agent, or Firm—Bailey & Hardaway

[57] ABSTRACT

Disclosed is a process for installing low voltage wiring wherein messenger cables are strung from a central floor location to diverse locations and a plurality of wires having fireproof installation are strung along messenger cables to desired locations.

8 Claims, 2 Drawing Sheets

PROCESS FOR BUILDING WIRE

This application is a continuation of application Ser. No. 550,924, filed Nov. 10, 1983, now abandoned.

BACKGROUND OF INVENTION

This invention relates generally to the art of wiring and more particularly to a process for installing low voltage wiring within a building structure.

Wiring of electrical components both power wiring as well as low voltage wiring such as telecommunication wiring within a building structure has come to represent a significant portion of the overall investment associated with such a structure. This is particularly true of the multi rise buildings adapted for multiple tenants as well as commercial building projects such as shopping centers and major industrial buildings.

Such structures have had to be constructed to house all wiring within conduit or metallic raceways in order to comply with fire safety requirements of local and national codes. Power wiring such as that utilized in normal electrical outlets must be separately installed from low voltage wiring thus requiring the use of separate conduit and metallic raceways for both such wiring systems. The installation of such systems represents a significant expense. Modification of wiring and maintenance of wiring within such conduits and raceways is difficult and complex, frequently requiring significant alteration of building interiors and reconstruction of same upon completion of the alteration or maintenance.

SUMMARY OF THE INVENTION

It is thus an object of this invention to provide a novel wiring system for utilization within a building structure.

It is a further object of this invention to provide such a system for low voltage electrical wiring which does not require the use of conduit or metallic raceways as has heretofore been required.

It is a still further and more particular object of this invention to provide a process of wiring the interior of a building structure which lends itself to alteration and maintenance without requiring major building adaptation.

These as well as other objects are accomplished by a process for installing low voltage wiring wherein messenger cables are strung from a central floor location to diverse locations and a plurality of wires having fireproof insulation are strung along the messenger cables to desired locations.

DETAILED DESCRIPTION

In accordance with this invention it has been found that to a large extent the expenses associated with conduit and metallic raceways may be eliminated for low voltage wiring within building structures. It has particularly been found that a wiring system may be utilized which greatly facilitates maintenance and modification of the wiring system without undue disruption and alteration previously required of building structures. Various other advantages and features of the process of this invention will be apparent from a reading of the following description given with reference to the various figures of drawing.

Figure 1:
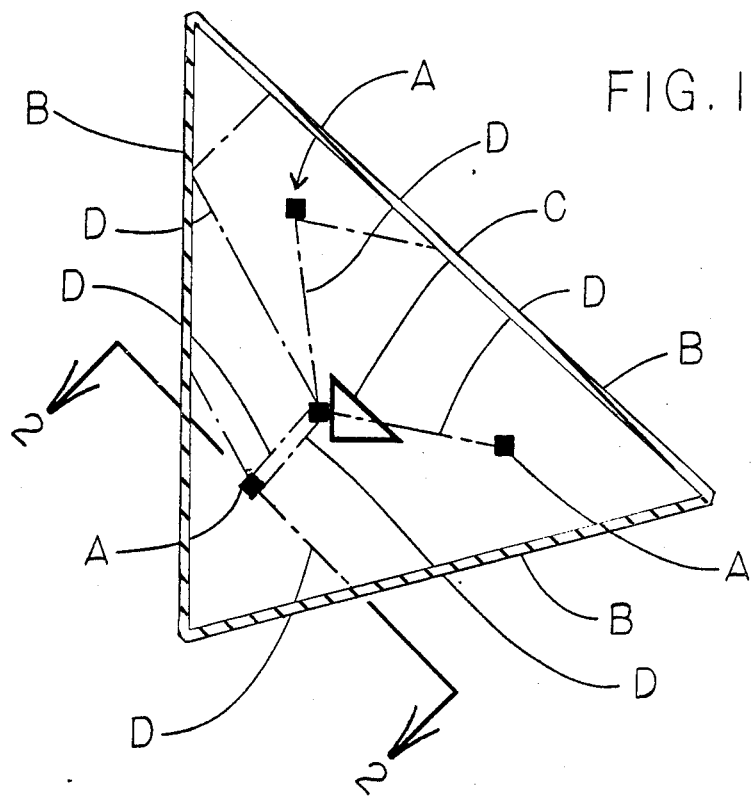
FIG. 1 is an elevational view of a floor plan on which the process of this invention is practiced.

FIG. 1 of the drawings illustrates an elevational view of a floor within a building structure. The floor has structural elements such as columns A located throughout the structure as well as outer walls B. A central wiring location C is illustrated as being substantially in the center of the floor plan.

The central wiring location is normally a low voltage wiring room placed on each floor of a building with an open chase which runs from floor to floor through which all wiring runs between floors. Such location is frequently referred to as a telecommunications riser room, and it is from this point that the process of this invention is carried out.

It is seen in FIG. 1 that a multiplicity of messenger cables D are illustrated as emanating from a telecommunication riser room C. This invention thus comprises stringing a plurality of messenger cables from a central location to diverse locations throughout the floor of the building in order to provide a common carrier for all low voltage wiring.

The term low voltage as utilized herein is in accordance with the National Electrical Code of 1983 and includes voltages below about 70.5 volts. All wiring in accordance with this invention is classified as fireproof and normally is the type of wiring which is insulated with polytetraflouroethylene (Teflon). The messenger cables as illustrated in FIG. 1 are above the normal room ceiling structure and are located in that portion which is normally utilized for heating, ventilation, and air conditioning equipment. This may be more readily appreciated by referring to FIG. 2 of the drawing which is taken along the line 2—2 of FIG. 1 and enlarged for purposes of illustration.

Figure 2:
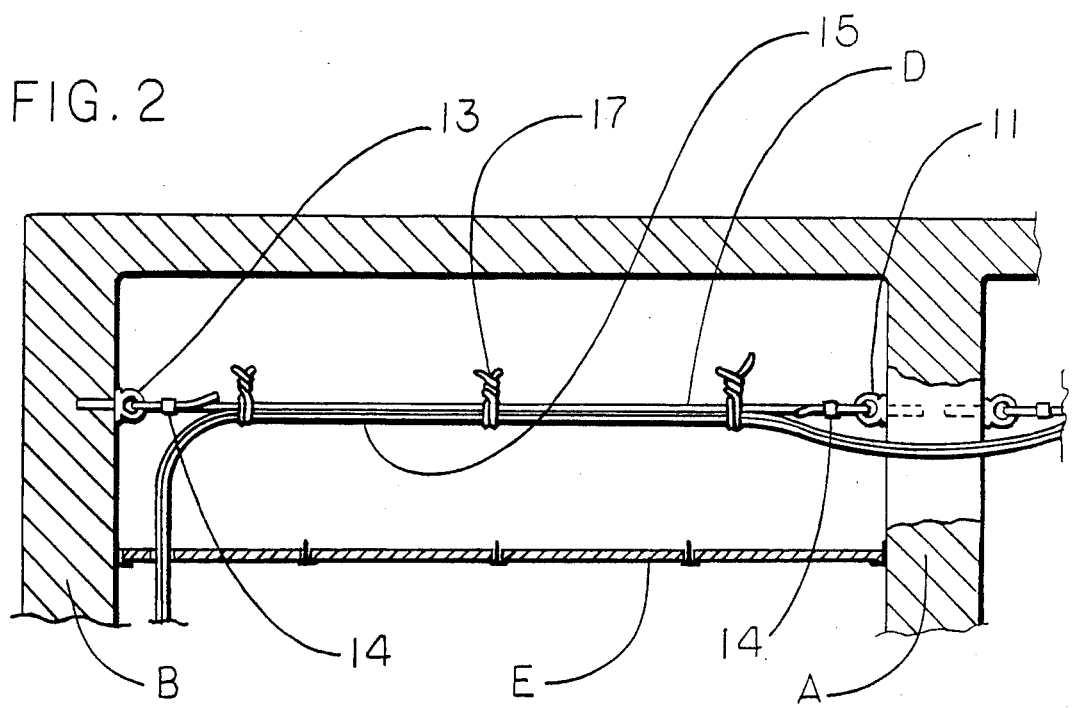
FIG. 2 of the drawings illustrates an enlarged view of a section along the line 2—2 of FIG. 1.

The messenger cable D is illustrated in FIG. 2 as being above ceiling structure E which is preferably of a removable nature to facilitate access to the wiring thereabove.

Messenger Cable D is attached to column A by an eyebolt 11 and to wall B by a similar eyebolt 13. The messenger cable is preferably of a 0.25 inch stranded steel and is attached to the eyebolt by merely threading therethrough and securing the end with a U-clamp 14. A plurality of wires having fireproof insulation thereon 15 are strung along the messenger cable and attached thereto by attachment means 17 which are preferably short lengths of wire coated with fireproof insulation. A preferred attachment means is number 16 copper wire having Teflon insulation thereon. It is seen that this wiring process does not require the use of conduits and raceways as was heretofore required and further that access to wiring system is greatly facilitated.

FIG. 1 illustrates that the system of this invention may be utilized to circumvent virtually any structural obstacle which may appear along the intended path. To this end, the messenger cables may utilize common attachment to facilitate stringing at acute angles so as to arrive at a desired location without unduly crowding other components which may be in the ceiling headway. This is best illustrated in FIG. 3 of the drawing.

Figure 3:
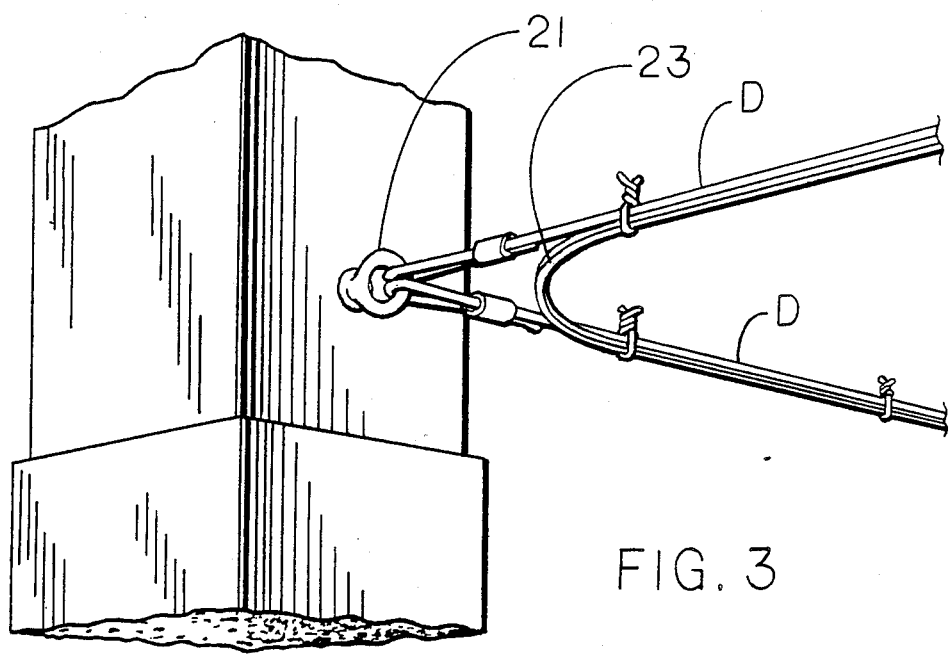
FIG. 3 illustrates in perspective a wiring system installed in accordance with the process of this invention.

FIG. 3 is a perspective view from beneath into a ceiling headspace wherein messenger cables D are attached to a common eyebolt 21 and wires 23 strung therealong to the eyebolt where the wires 23 proceed at an acute angle to a desired location. Upon arrival at a desired location the wires are merely draped to the interior of a wall space for termination.

The low voltage wiring which is utilized with this invention is in compliance with most wiring standards. The type of wiring may include any of the following: telecommunications wiring, coaxial wiring for data, or computer interconnection, central music and paging, and security such as fire alarm and burglar alarm wiring as well as entrance and exit detector wiring.

It has been found that during the initial building construction process, that messenger cables and appropriate wiring can be strung from the telecommunication riser room to all structural components to effect virtually any tenant or floor riser requirement without having to disturb other tenant space. If other tenant space must be disturbed it would be for a minimum period of time not requiring a removal of complex metallic raceways or conduit or the difficulties associated with stringing additional wiring through such conduit and raceways.

Figure 4:
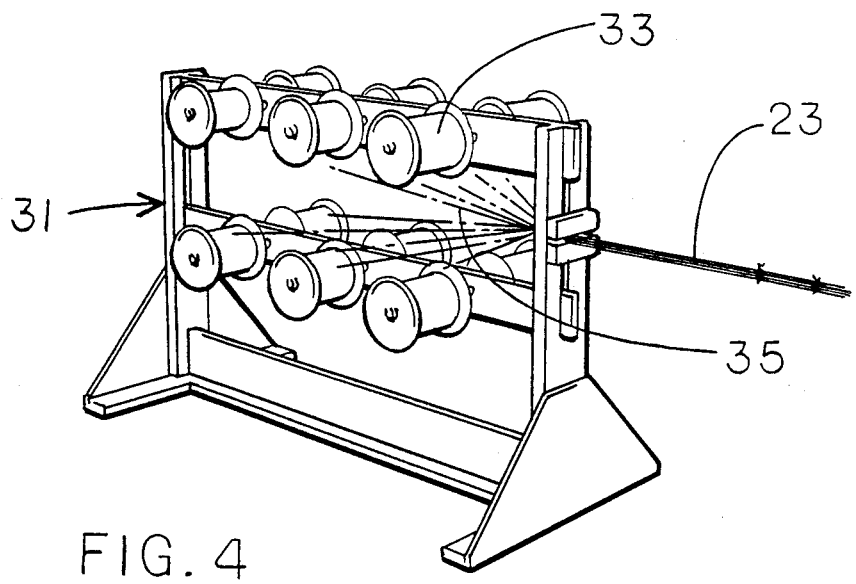
FIG. 4 illustrates a creel for use in carrying out the process of this invention.

FIG. 4 of the drawings illustrates a creel 31 which may be utilized in carrying out the process of this invention. The creel 31 has a plurality of wire rolls 33 from which individual wires 35 are removed and rebundled to form bundle 23. Individual wires 35 are preferably labeled at each end of the bundle 23 so as to be fully identified before the bundle 23 is severed from the creel 31. Such identification may include type of wire, intended floor or any other information which is obtainable from the creel.

A significant advantage in the construction process utilizing process of this invention is that licensed electrical technicions are not required to install the systems since the messenger cables can be installed by construction personnel and the step of stringing the wire bundles is simple and quick requiring minimal time from highly paid licensed electrical personnel.

It is thus seen that the process of this invention provides a system which elimates the need for prior art conduit and metallic raceways as well as providing a system which is easily maintained and modified without expensive building alterations. As many variation will become apparent from a reading of the above specifications, such variations are embodied within the spirit and scope of the following appended claims.

That which is claimed is:

1. A process for installing low voltage wiring on the interior of a building structure without the use of metallic conduit or raceways, comprising the steps of:

Stringing messenger cables from a central floor location to diverse floor locations, said messenger cables being attached to structural building components in a space above interior wall structures between structural ceilings and interior ceilings of the building structure;

Stringing a plurality of wires having fireproof insulation thereon from said central floor location to diverse locations by attaching said wires to said messenger cable with fireproof attaching means; and Draping said wires from said diverse locations to interior wall locations.

2. The process according to claim 1, wherein said fireproof insulation comprises polytetraflouroethylene.

3. The process according to claim 1, wherein said step of stringing messenger cable comprises attaching said cable to eyebolts secured to said structural building components.

4. The process according to claim 1 further comprising attaching two cables to the same attachment and stringing said wires from one of said cables to the other of said cables on said same attachment.

5. The process according to claim 1 wherein said low voltage wiring comprises, telecommunication wiring, coaxial wiring for computer interconnections, central music and paging wiring and security wiring.

6. The process according to claim 1 furthur including attaching identification to wire terminations prior to stringing said wires.

7. The product produced by the process of claim 1.

8. The process according to claim 4 wherein said attachment is to a structural building component.

* * * * *